United States Patent [19]
Hough

[11] 4,123,012
[45] Oct. 31, 1978

[54] CORD HOLDER

[76] Inventor: W. Colton Hough, 18 Meadow La., E. Williston, N.Y. 11596

[21] Appl. No.: 796,086

[22] Filed: May 12, 1977

[51] Int. Cl.² .......................................... B65H 75/36
[52] U.S. Cl. .................................................. 242/85.1
[58] Field of Search .................. 242/85.1, 96, 125.1, 242/125.2; 191/12.2 R, 12.2 A, 12.4

[56] References Cited

U.S. PATENT DOCUMENTS

| 469,687 | 3/1892 | Felix | 242/85.1 |
| 1,058,925 | 4/1915 | Toegel | 242/85.1 |
| 1,458,420 | 6/1923 | Keel | 242/96 |
| 1,540,244 | 6/1925 | Berglund | 242/85.1 |
| 2,143,529 | 1/1939 | White | 242/85.1 |
| 3,926,383 | 12/1975 | McConnell | 242/85.1 |

FOREIGN PATENT DOCUMENTS 455,807  6/1913  France ...................................... 242/96

Primary Examiner—Edward J. McCarthy
Attorney, Agent, or Firm—Arthur A. March

[57] ABSTRACT

A cord holder for extension cords or the like comprising parallel side walls and interconnecting cross members disposed between the ends of the side walls around which the cord may be wrapped with reinforcing ribs at the junction of the side walls and the cross members; a handle connected to one of said side walls and reinforcing ribs at the junction of the handle and the side walls; keyways in one of the side walls to accommodate the head of a nail or the like for storage and clips on the other side wall to receive the enlarged ends of an extension cord.

2 Claims, 4 Drawing Figures

CORD HOLDER

BACKGROUND OF THE INVENTION

This invention relates to the art involving maintenance means or holders for relatively long pieces of cord or ropes as, for example, an extension cord.

Heretofore, there has been a recognized problem in maintaining extension cords or items similar thereto in a secure and compact fashion. As a result of the length of the cord, it is of course difficult to maintain it neatly and yet available for the purposes intended. There have been many proposals to provide equipment for maintaining such cords or lines in position around holding means.

U.S. Pat. No. 605,607 provides a clothes line holder comprising parallel side bars united together by stretchers with a panel intermediate the stretchers. U.S. Pat. No. 622,855 shows a clothes line reel consisting of two side strips of flattened wire or metal bars having four holes formed therein. A single piece of wire is passed through these holes bent to form curved sections lying between the side stretchers with a handle portion being provided exteriorly of one of the side strips. U.S. Pat. No. 1,035,825 provides a single strand of wire bent upon itself into a form for maintaining wash lines. U.S. Pat. No. 1,540,244 also shows a single piece of metal set forth as preferably formed from a single length of stout wire for a clothes line reel. The wire is bent upon itself to form recessed portions at both ends and provided with a handle portion. U.S. Pat. No. 3,817,471 provides a line holder having U-shaped portions at both ends with indentations in one of the end edges for holding the line wrapped endwise around the holder. U.S. Pat. No. 3,924,819 shows an extension cord holder with a central tubular main body portion around which the cord is to be wrapped between two diametrically opposed flanges.

Thus it may be seen that because of the nature of the art, various modifications of certain basic structure have been provided and each in turn has been deemed significant enough to be patentable despite the apparent simplicity thereof. None of the foregoing, however, provide a single unitary structure made of relatively light material provided with cross members which are reinforced to prevent breaking or buckling of the unit under the pressures which may be exerted. In addition, none of the foregoing disclosures provide a handle means integral with the remainder of the unit in which the portions of the handle connecting to the side walls of the holder are also reinforced by structure to prevent breakage.

In addition, the foregoing prior art in no way discloses means integral with the holder itself for maintaining the holder in position for storage. They also do not show the provision of means for maintaining and locking the connecting male and female members of the extension cord holder in position. As a consequence, a full and complete cord or line holder has not been provided heretofore in an economical fashion with suitable means to prevent breakage; to maintain the holder in position; and to secure the ends of the extension cord when the holder is stored.

SUMMARY OF THE INVENTION

The present invention in essence provides a unitary integral holder for lines as, for example, extension cords which comprises a single molded plastic shaped form. The form has two relatively elongate side walls with two cross bars provided intermediate the ends. The cross bars have reinforcing ribs at the juncture of the bars with the side walls to prevent collapsing or damage by pressure to the Unit. A handle portion integral with one of the side bars is provided in such fashion that the hand gripping the article is confined within an aperture provided for the purpose. The junction of the handle with the adjacent side bar is also provided with reinforcing ribs to prevent collapse of this portion which might otherwise occur during handling of the device.

The side wall opposite the handle portion is provided with at least one keyway adapted to accommodate the head of a nail, tack or screw for maintaining the unit in position in storage. The unit is provided with at least one clip portion for accommodating the male and/or female members of an extension cord to hold them in fixed position with the unit itself.

By the foregoing structure, a relatively economic one piece unit has been provided having reinforcement means in those areas where the unit is susceptible to damage and provided with recesses for storage means for the accommodation of the ends of the extension cord or the like in one integral piece.

The unit will be described in some detail in connection with an embodiment thereof as set forth in the following drawings and specification.

DETAILED DESCRIPTION OF THE PRESENT INVENTION

Figure 1:
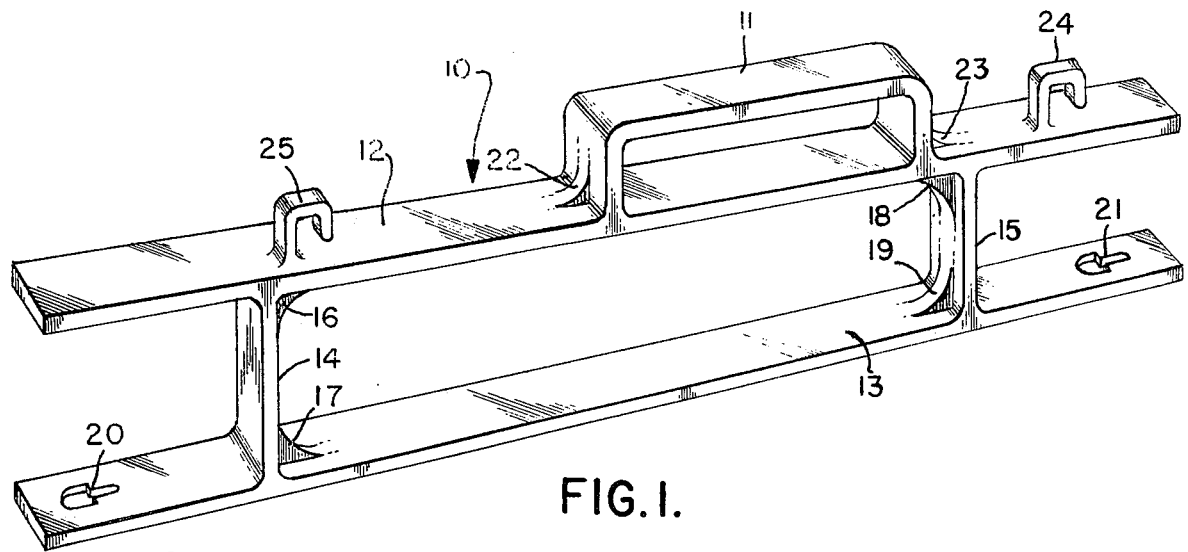
FIG. 1 is a perspective view of the cord holder of the present invention.

As shown in the drawings, the present invention provides a cord holder 10, preferably made of a molded unitary piece of plastic material. While the invention may be utilized in connection with the storage of other cord as, for example, cord for flying kites, cord for clothes lines and the like, the following description will involve extension cords 11 which should be construed to include the aforementioned other types of cord.

As illustrated, the cord holder comprises two side walls 12 and 13 which are relatively elongate and are substantially parallel to each other. The side walls for economy and weight factors are provided of a semi-resilient light plastic material. The side walls 12 and 13 are connected near their respective ends by cross members 14 and 15 which may also be designated as bridges. As shown, these cross members are also substantially parallel to each other for the purposes hereinafter set forth. As a result of the construction, it is possible for the side walls to bend and flex and they would, under certain circumstances, be subject to breakage. In accordance with the present invention, however, means are provided to prevent or substantially inhibit any such breakage. These means are in the form of reinforcing ribs 16 and 17 at the juncture of the side walls with cross member 14. In addition, there are reinforcing ribs 18 and 19 at the juncture of the side walls with the cross member 15. While the reinforcing ribs have been illustrated in rounded form, which is preferred, they are not limited to this form for any shape achieving the desired result may be utilized.

Figure 2:
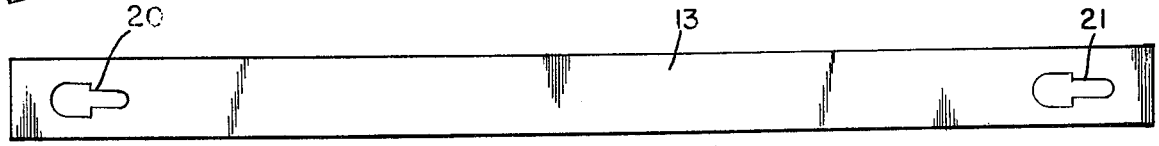
FIG. 2 is a planned view of a side wall of the cord holder of the present invention showing the means for retaining the holder in storage.

The holder 10 of the present invention, as illustrated in FIG. 2, is also provided with slots or keyways 20 and 21 disposed adjacent the top and bottom of side wall 13. This structure, it has been found, provides a simple and easy manner in which to store the cord holder as a unit when it is not in use. The keyways obviously are constructed so as to accommodate in each slot, the head of a nail, screw or tack (not shown) which is maintained on the wall of a storeroom or on the door or walls of a closet or the like.

Also as illustrated, the cord holder 10 is provided with an integral handle portion 11 outwardly disposed from the side wall 12. The handle is located in this position in order that it not interfere with the storage of the device accomplished by the keyways 20 and 21 on the other side wall 13. The handle, as illustrated, can surround the hand of the user enabling the hand to be maintained in position without slippage from the handle while the device is being manipulated. In addition, according to the invention, the handle is provided with reinforcing ribs 22 and 23 at the junction of the top and bottom portion of the handle and the side wall 12. These ribs function to prevent breakage of the holder during handling at this location.

Thus a unitary structure has been provided with completely satisfactory reinforcement to prevent or at least inhibit structural damage to the portions of the unit most susceptible to damage during use and extensive handling. The ribs 22 and 23 are also illustrated as being curved in shape but, of course, any shape may be utilized which can accomplish the aforesaid desired result.

Figure 3:
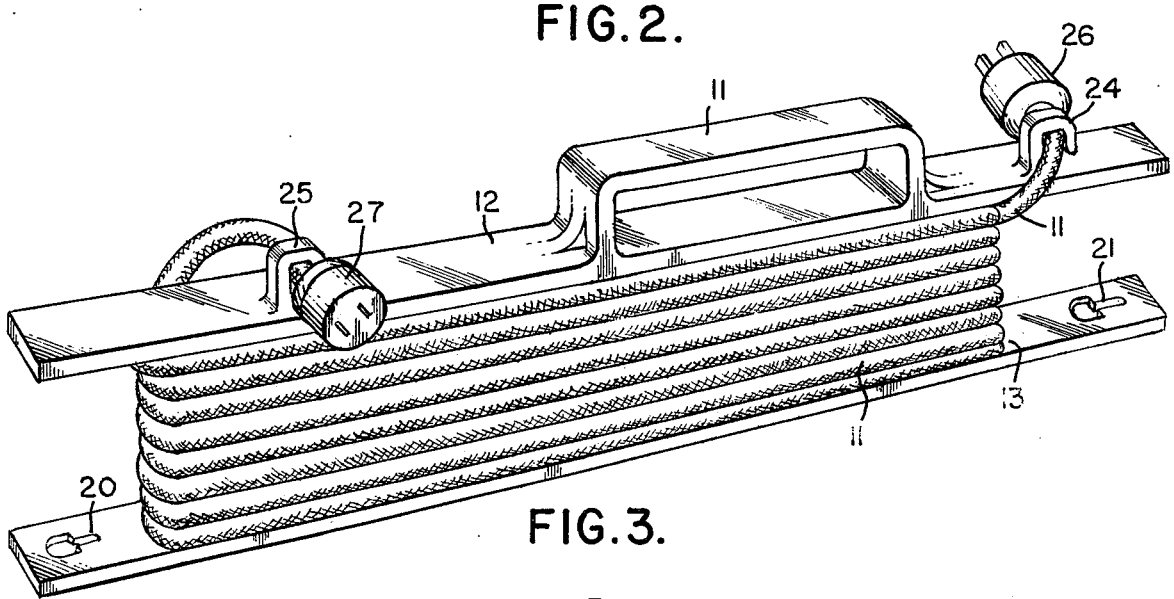
FIG. 3 is a perspective view of the cord holder of the present invention with an extension cord wrapped therearound with the male and female ends of the extension in position within the clips provided in the holder.
Figure 4:
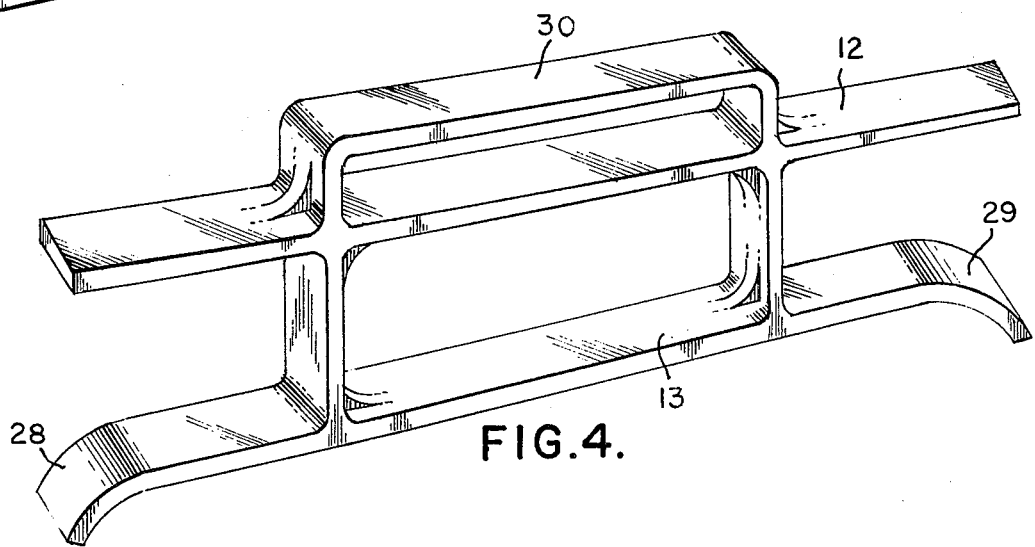
FIG. 4 is a perspective view of a modified form of the cord holder of the present invention.

In accordance with the present invention, there are also provided two clips 24 and 25 integral with and extending outwardly from side wall 12. These clips are also so positioned as to not interfere with the storage keyways 20 and 21 on side wall 13. As illustrated in FIG. 3, the male member 26 of the cord 11 which bears the prongs is maintained within the confines of the clip 24 while the female member 27 of the cord 11 which has the recesses is maintained within the confines of the clip 25. As a consequence, it is possible to store the entire extension cord including the enlarged ends which are the male and female members of the cord in an extremely neat and tidy manner. FIG. 4 shows a modified version of the cord holder of the present invention. In this embodiment, the side wall 13 is provided with flared end portions 28 and 29. These flared ends make it possible to unwind the cord from the holder in an efficient and rapid manner with the cord easily being removed from the holder over one of the flared ends. This structure is especially useful when the device is being utilized as the holder for the cord used in flying kites.

In this modified version, it is to be noted that the handle portion 30 is somewhat larger in relation to the entire unit than the size of the handle portion in the unit illustrated in FIGS. 1-3. This is provided to enable greater manipulation of the device under the conditions of letting out cord for kite flying or for similar purposes.

The present invention therefore provides a unique and novelt cord holder with reinforcing means for preventing or inhibiting breakage at appropriate points and for reinforcing the junction of the handle portion with the side wall. The holder also has simple means for storage of the unit and the accommodation of the enlarged portions of an extension cord for similar line.

It is to be noted that while the invention is described in some detail, this specific description is not to be construed as limiting the invention and variations and modifications may be made without departing from the spirit of the invention as defined in the appended claims.

I claim:

1. An integral cord holder comprising:
   side walls disposed substantially parallel to each other;
   an upper cross member connecting the upper portions of said side walls;
   a lower cross member connecting lower portions of said side walls;
   said cross members being substantially parallel to each other;
   a reinforcing rib at the juncture of said upper cross member to said portions of said side walls;
   a reinforcing rib at the juncture of the said lower cross member to said lower portions of said side walls;
   a handle integral with one of said side walls;
   reinforcing ribs at the juncture of said handle to said side walls;
   a clip integral with one of said side walls for receiving the enlarged end of an extension cord whereby said enlarged end is secured for storage.

2. The integral cord holder of claim 1 including a keyway in one side wall for receiving a supporting member for the storage of said cord holder.

* * * * *